(12) United States Patent
Lefez et al.

(10) Patent No.: US 10,217,372 B2
(45) Date of Patent: Feb. 26, 2019

(54) METHOD AND SYSTEM FOR AIDING THE GROUND ROLLING OF AN AIRCRAFT

(71) Applicant: Airbus Operations SAS, Toulouse (FR)

(72) Inventors: Thibault Lefez, Saiguede (FR); Pierre Scacchi, Toulouse (FR); Olivier Laplace, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 15/544,599

(22) PCT Filed: Jan. 15, 2016

(86) PCT No.: PCT/EP2016/050799
§ 371 (c)(1),
(2) Date: Jul. 19, 2017

(87) PCT Pub. No.: WO2016/116374
PCT Pub. Date: Jul. 28, 2016

(65) Prior Publication Data
US 2017/0372626 A1    Dec. 28, 2017

(30) Foreign Application Priority Data

Jan. 20, 2015 (FR) ..................................... 15 50420

(51) Int. Cl.
*G08G 5/00* (2006.01)
*G08G 5/06* (2006.01)
(Continued)

(52) U.S. Cl.
CPC ............. *G08G 5/065* (2013.01); *B64D 43/00* (2013.01); *B64D 47/08* (2013.01); *G06T 11/60* (2013.01); *H04N 7/181* (2013.01); *G08G 5/0021* (2013.01)

(58) Field of Classification Search
None
See application file for complete search history.

(56) References Cited

U.S. PATENT DOCUMENTS

| 6,405,975 B1* | 6/2002 | Sankrithi | B64D 47/08 |
| | | | 244/1 R |
| 2003/0122930 A1* | 7/2003 | Schofield | B60R 1/00 |
| | | | 348/148 |

(Continued)

FOREIGN PATENT DOCUMENTS

| EP | 0980828 | 2/2000 |
| EP | 2495168 | 9/2012 |
| FR | 2795045 | 12/2000 |

OTHER PUBLICATIONS

International Search Report, dated Mar. 9, 2016, priority document.

*Primary Examiner* — Dakshesh D Parikh
(74) *Attorney, Agent, or Firm* — Greer, Burns & Crain Ltd.

(57) ABSTRACT

In an aircraft comprising a cockpit comprising a display screen, a camera configured to acquire images of the environment of the aircraft, as well as a display management system, a ground rolling aid system configured so as to a) acquire several successive images of the environment of the aircraft via the camera, corresponding to various ground positions of the aircraft, b) modify these images by removing at least zones corresponding to the aircraft, so as to produce modified images, c) combine several of the modified images to produce a recomposed image, d) superpose an image characteristic of the aircraft on the recomposed image so as to produce a reference image, and e) display, on the cockpit display screen, an image corresponding to the reference image.

9 Claims, 6 Drawing Sheets

(51) Int. Cl.
  *H04N 7/18* (2006.01)
  *B64D 43/00* (2006.01)
  *B64D 47/08* (2006.01)
  *G06T 11/60* (2006.01)

(56) References Cited

U.S. PATENT DOCUMENTS

| | | | | |
|---|---|---|---|---|
| 2009/0079828 | A1* | 3/2009 | Lee | B60R 1/00 348/148 |
| 2012/0224058 | A1* | 9/2012 | Benning | B64D 47/08 348/144 |
| 2013/0335566 | A1* | 12/2013 | Coulter | H04N 7/181 348/144 |

* cited by examiner

METHOD AND SYSTEM FOR AIDING THE GROUND ROLLING OF AN AIRCRAFT

CROSS-REFERENCES TO RELATED APPLICATIONS

This application claims the benefit of the French patent application No. 1550420 filed on Jan. 20, 2015, the entire disclosures of which are incorporated herein by way of reference.

BACKGROUND OF THE INVENTION

The invention relates to a method and a system for assisting in the taxiing of an aircraft on the ground, and to an aircraft comprising such a system for assisting in the taxiing on the ground.

Aircraft, in particular passenger transport airplanes, are required to taxi on the ground on airport surfaces. The taxiing on the ground generally takes place between a passenger embarkation gate and a take-off (or landing) runway, and vice versa. For that, the pilot of the aircraft must maneuver the aircraft on the airport surface, which generally comprises straight sections linked by bends. The pilot must, in particular, pay attention to not allowing the wheels of the aircraft to depart from the areas provided for the taxiing in order to avoid any risk of the aircraft being bogged down. He or she must also pay attention to ensuring that the aircraft, in particular the extreme parts thereof such as the wings, do not touch an obstacle on the ground such as a pylon, another vehicle, etc. To assist the pilot in this task, some aircraft, in particular aircraft of large dimensions, are provided with a camera and with a screen in the cockpit making it possible to display images captured by the camera. The camera is generally placed on the vertical stabilizer or under the fuselage of the aircraft. A camera placed on the vertical stabilizer makes it possible to obtain images of the top of the fuselage, and of the environment of the aircraft. A camera placed under the fuselage makes it possible to obtain images of the landing gear and of the taxiing surface on which they are moving. These images make it possible to assist the pilot in maneuvering the aircraft. The document EP0980828 (U.S. Pat. No. 6,405,975) describes a system for assisting in the taxiing of an aircraft on the ground comprising such cameras. However, the images from the camera situated under the fuselage correspond only to a very localized view of the situation of the aircraft, limited to the environs of the landing gear and the images originating from the camera situated on the vertical stabilizer correspond to a view that is more global but in which the taxiing surface is concealed by the fuselage and the wings of the aircraft. Furthermore, the image capture angle is not always that which allows the best interpretation of the images by the pilot. Consequently, it would be desirable to be able to display, in the cockpit, images that make it possible to improve the awareness of the situation by the pilot, in particular, to enable him or her to assess the overall situation of the aircraft on the surface of the airport and, at the same time, assess the position of the landing gear of the aircraft on said surface.

SUMMARY OF THE INVENTION

The aim of the present invention is, in particular, to provide a solution to these problems. It relates to a method for assisting in the taxiing of an aircraft on the ground, this aircraft comprising:
a cockpit comprising a display screen,
a camera configured to acquire images of the environment of the aircraft; and
a display management system configured to display images on the display screen of the cockpit according to images acquired by the camera,
said method comprising the following step:
a) acquiring several successive images of the environment of the aircraft by means of said camera, during a displacement of the aircraft on the ground, these images corresponding to the different positions of the aircraft on the ground.

The method is noteworthy in that it further comprises the following steps implemented by the display management system:
b) modifying said images by subtracting from said images at least areas corresponding to the aircraft, to produce modified images;
c) combining several of said modified images to produce a recomposed image;
d) superimposing a characteristic image of the aircraft on the recomposed image to produce a reference image; and
e) displaying, on the screen of the cockpit, an image corresponding to the reference image.

Thus, by combining several images corresponding to successive positions of the aircraft, the method makes it possible to obtain a recomposed image and a reference image in which the aircraft taxiing surface is no longer masked by the fuselage and/or the wings of the aircraft.

Furthermore, given that the recomposed image is obtained by combining several images, it corresponds (as does the reference image) to a more global snapshot of the situation of the aircraft, compared to the images displayed in the cockpit according to the prior art.

According to particular embodiments that can be taken into account alone or in combination:
the method comprises an additional step, after the step a) or the step b), of transformation of the images according to a point of view corresponding to a plan view of the aircraft;
in the step c), the images are combined by matching characteristic elements common to several of said images;
in the step c), the images are combined by taking into account positions of the aircraft on the ground corresponding to these images;
in the step d), the characteristic image of the aircraft comprises at least one of the following elements:
an outline of the aircraft; and
symbols representative of landing gear of the aircraft;
the method comprises the following step after the step d):
d1) applying a transformation of the reference image so as to produce a reference image according to a particular point of view.

Advantageously, the particular point of view corresponds to one out of the following points of view:
a point of view corresponding to a plan view of the aircraft;
a point of view corresponding to the point of view of the camera; and
an intermediate point of view between the two preceding points of view.

In a particular embodiment, the particular point of view varies as a function of a taxiing speed of the aircraft on the ground.

According to one embodiment, the method comprises the following step after the step d):
d2) extracting, from the reference image, a part to be displayed of the reference image, and, in the step e), the image extracted in the step d2 is used as image corresponding to the reference image.

The invention also relates to a system for assisting in the taxiing of an aircraft on the ground, this aircraft comprising:
- a cockpit comprising a display screen,
- a camera configured to acquire images of the environment of the aircraft; and
- a display management system configured to display images on the display screen of the cockpit according to images acquired by the camera, the system for assisting in the taxiing on the ground being configured to:
a) acquire several successive images of the environment of the aircraft by means of said camera, during a displacement of the aircraft on the ground, these images corresponding to different positions of the aircraft on the ground.

The system for assisting in the taxiing on the ground is noteworthy in that the display management system is configured to:
b) modify said images by subtracting from said images at least areas corresponding to the aircraft, to produce modified images;
c) combining several of said modified images to produce a recomposed image;
d) superposing a characteristic image of the aircraft on the recomposed image to produce a reference image; and
e) displaying, on the screen of the cockpit, an image corresponding to the reference image.

The invention also relates to an aircraft comprising a cockpit comprising a display screen, a camera configured to acquire images of the environment of the aircraft and a display management system configured to display images on the display screen of the cockpit according to images acquired by the camera, the aircraft comprising a system for assisting in the taxiing on the ground as mentioned above.

BRIEF DESCRIPTION OF THE DRAWINGS

The invention will be better understood on reading the following description and on studying the attached figures.

DETAILED DESCRIPTION OF THE PREFERRED EMBODIMENTS

Figure 1:
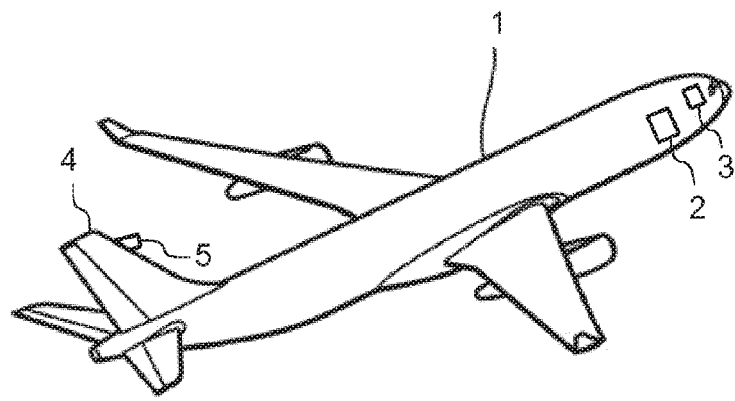
FIG. 1 is a simplified illustration of an aircraft comprising a camera.
Figure 2:
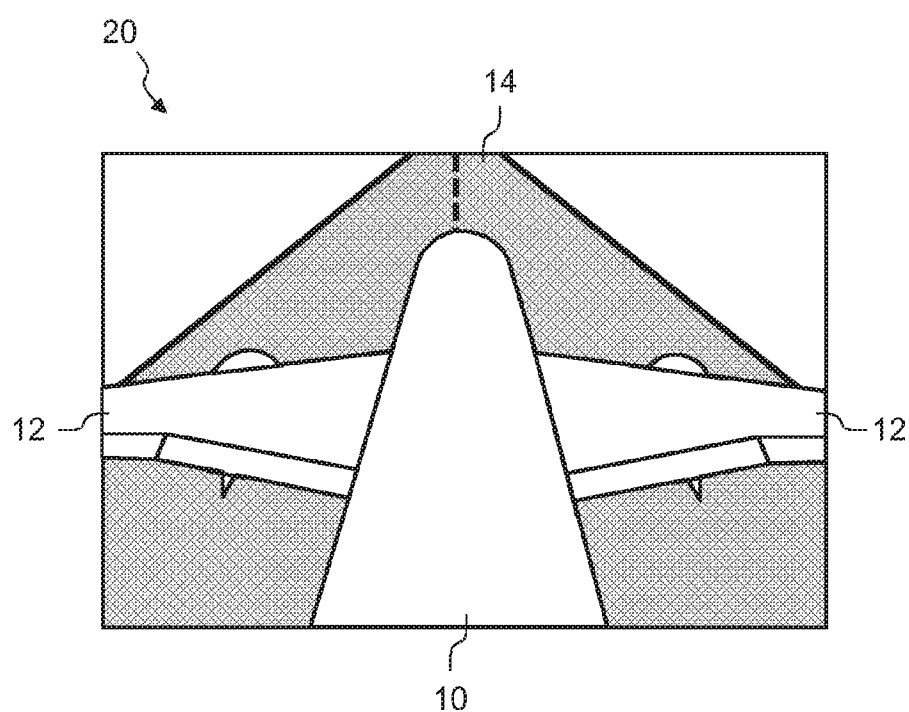
FIG. 2 represents an image acquired by a camera situated on the vertical stabilizer of the aircraft of FIG. 1.
Figure 3:
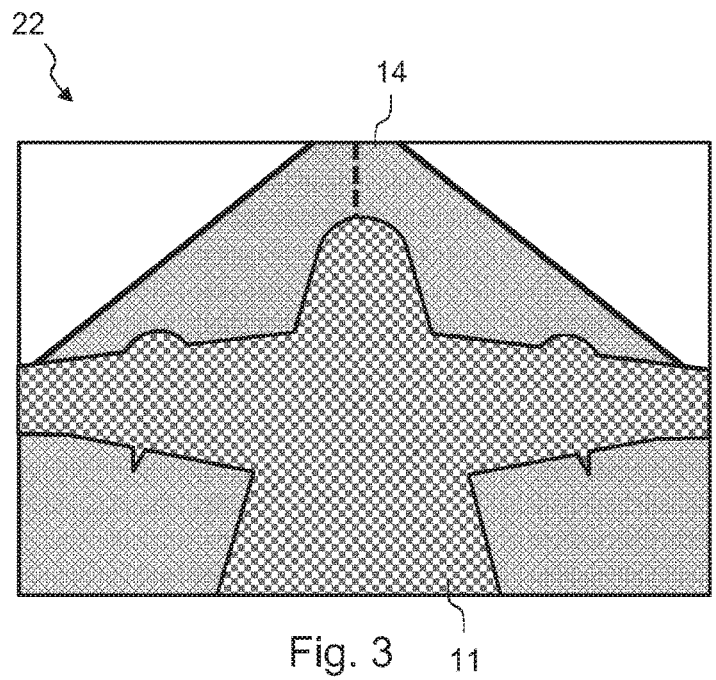
FIG. 3 corresponds to the image of FIG. 2, modified by subtracting areas of the image corresponding to the aircraft.
Figure 4:
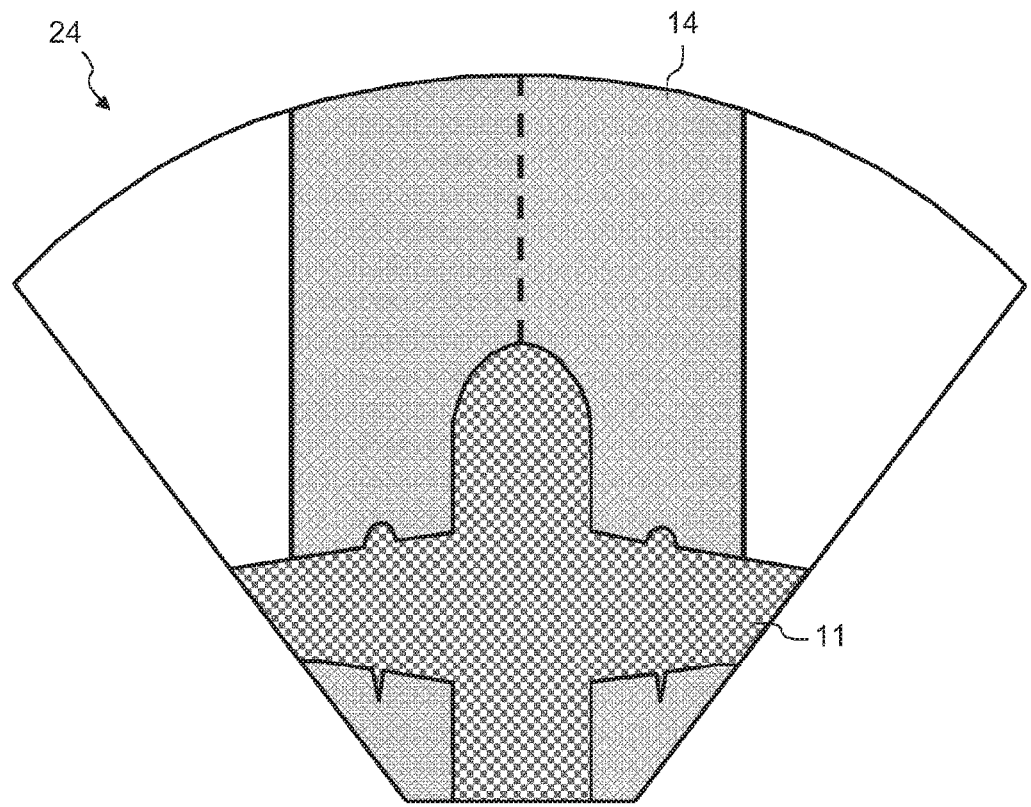
FIG. 4 corresponds to the image of FIG. 3, transformed according to a point of view corresponding to a plan view of the aircraft.
Figure 5A:
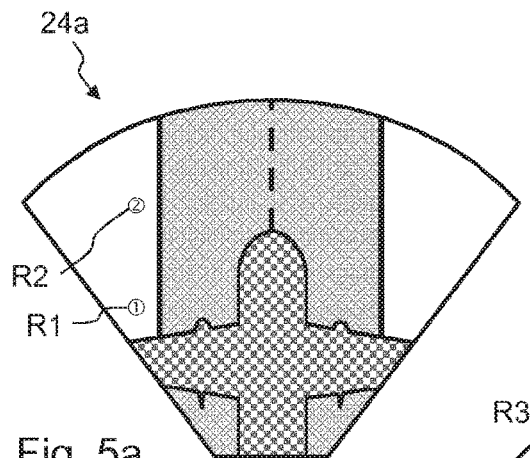
FIGS. 5a, 5b, 5c, 5d and 5e represent images similar to the image of FIG. 4, corresponding to different successive instants during the taxiing of the aircraft on an airport surface.
Figure 5B:
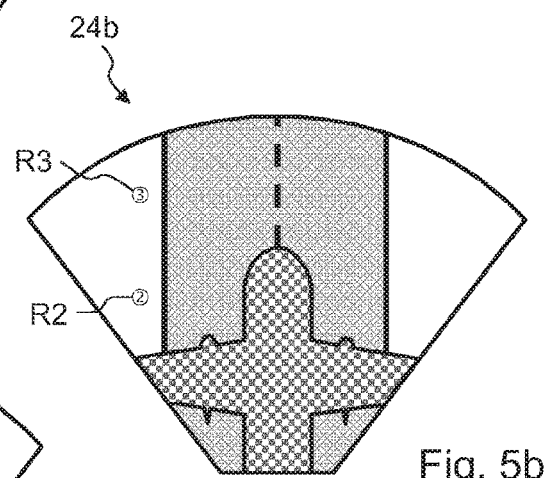
Figure 5C:
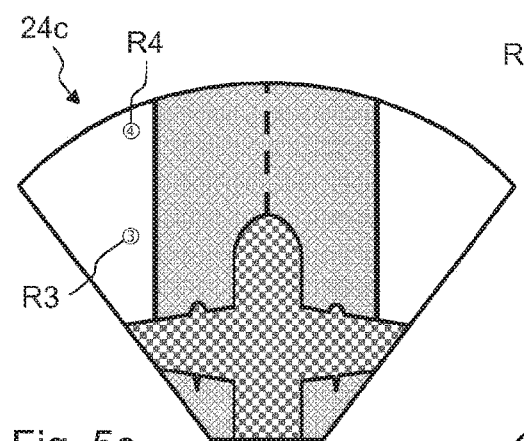
Figure 5D:
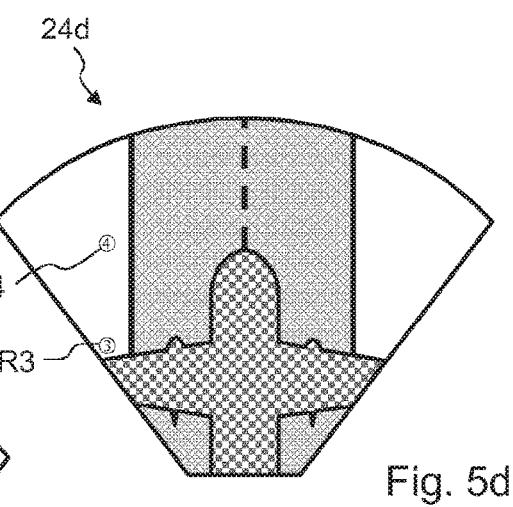
Figure 5E:
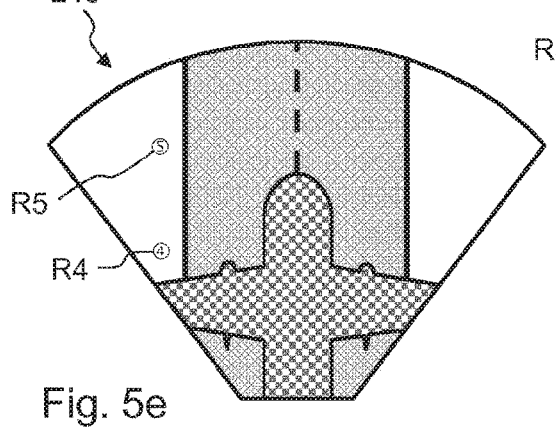
Figure 10:
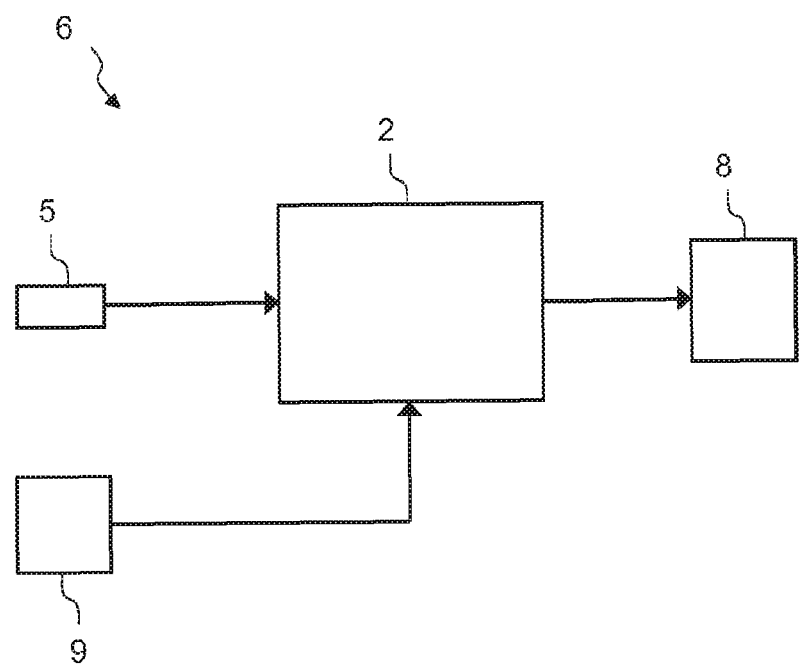
FIG. 10 represents a system for assisting in the taxiing on the ground according to an embodiment of the invention.

The aircraft 1 represented in FIG. 1 comprises a cockpit 3, and a vertical stabilizer 4 on which a camera 5 is installed. As represented in FIG. 10, the aircraft also comprises a system for assisting in the taxiing on the ground 6, comprising a display management system 2 corresponding to a computer or to a set of computers situated in an avionics bay of the aircraft. The display management system 2 is linked to the camera 5 from which it can acquire images. The display management system is also linked to a display screen 8 of the cockpit 3 and it is configured to display images on the screen 8 of the cockpit. The camera 5 is oriented so as to allow the acquisition of images of the aircraft and of its environment when the aircraft is taxiing on the ground, particularly on an airport surface. FIG. 2 represents an example of an image 20 acquired by the camera 5. This image comprises, in particular, the fuselage 10 and a part of the wings 12 of the aircraft, as well as a track 14 of an airport on which the aircraft is traveling. According to one embodiment of the invention, the display management system 2 is configured to acquire the image 20 originating from the camera 5 and to compute, from the image 20, a modified image 22 as represented in FIG. 3. For that, the display management system is configured to subtract from the image 20 an area 11 corresponding to the aircraft, that is to say, to associate with this area 11 of the image an attribute signifying that the area 11 is transparent. The area 11 corresponds to the fuselage 10 and to the parts of the wings 12 represented in the image 20. In as much as the camera 5 is positioned fixedly on the vertical stabilizer 4 and the zoom of the camera is fixed, the area 11 corresponding to the aircraft is a fixed area of the image. This area can therefore be parameterized permanently in the display management system 2. The management system is also configured to compute an image 24, represented in FIG. 4, from the image 22. For that, the display management system 2 transforms the image 22 according to a point of view corresponding to a plan view of the aircraft, by using a conventional image transformation method. Without departing from the scope of the invention, the transformation of the image according to the point of view corresponding to a plan view of the aircraft could also be applied directly to the image 20 acquired by the camera 5, the area 11 corresponding to the aircraft then being subtracted from (made transparent in) the duly transformed image.

Figure 6:
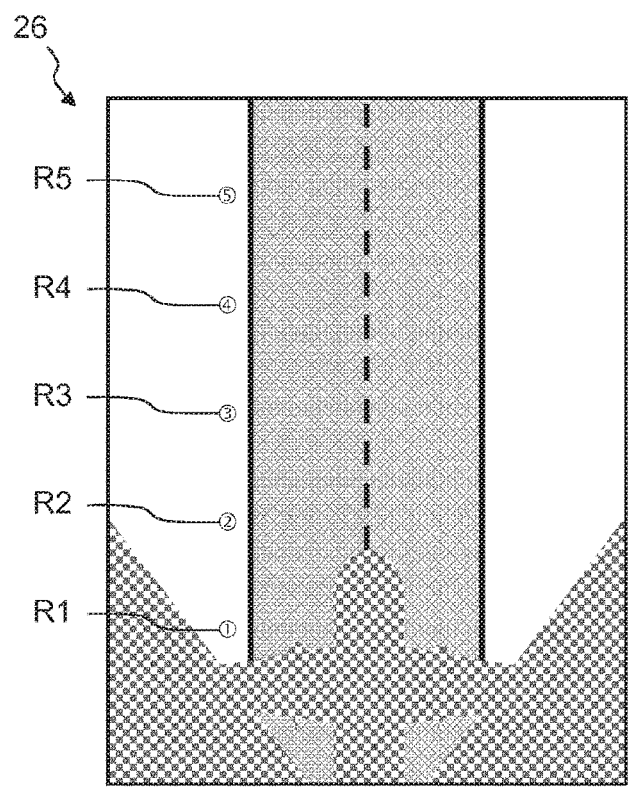
FIG. 6 represents a recomposed image corresponding to a combination of the images of FIGS. 5a, 5b, 5c, 5d and 5e.
Figure 7:
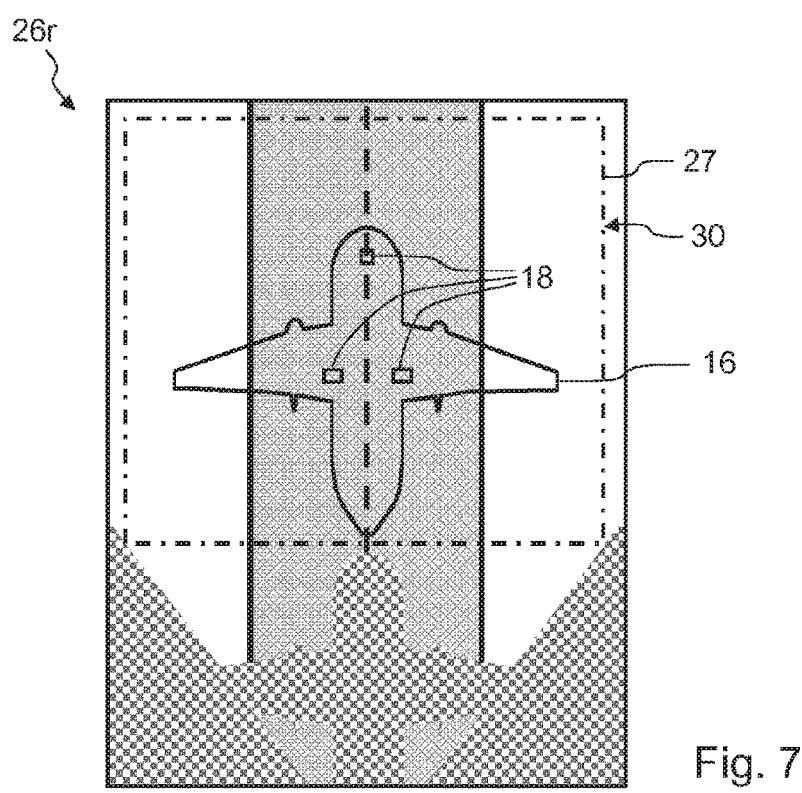
FIG. 7 corresponds to the image of FIG. 6 on which is superposed a characteristic image of the aircraft.

According to the abovementioned embodiment of the invention, provision is made to acquire several successive images (not represented) 20a, 20b, 20c, 20d, 20e, etc. of the aircraft, corresponding to successive instants. These images are similar to the image 20. From said images, the display management system computes modified images 22a, 22b, 22c, 22d, 22e (not represented) by subtracting (making transparent) the area 11 corresponding to the aircraft. These modified images are similar to the image 22. The display management system computes images 24a, 24b, 24c, 24d, 24e by transforming the modified images according to a point of view corresponding to a plan view of the aircraft. These images, similar to the image 24, are respectively represented in FIGS. 5a, 5b, 5c, 5d and 5e. Identifiers R1, R2, R3, R4, R5 are represented in these figures for a better understanding of the embodiment of the invention. The display management system is configured to combine the images 24a, 24b, 24c, 24d, 24e to produce a recomposed image 26 represented in FIG. 6. This recomposed image is computed by superposing identical parts of the different images 24a, 24b, 24c, 24d, 24e. In the example represented in the figures, the image 26 is computed by matching the identifiers R1, R2, R3, R4, R5 of the images 24a, 24b, 24c, 24d, 24e. According to a first variant, the superposition of the identical parts of the different images is done by taking account of an item of information related to aircraft position, on the airport surface, associated with each of said images. The knowledge of the position information associated with the different images makes it possible to compute offsets to be applied between the different images upon their superposition. Advantageously, the system for assisting in the taxiing on the ground comprises a source of information 9 linked to the display management system 2, this source of information 9 corresponding for example to a GPS receiver or to an inertial reference system IRS of the aircraft. The aircraft position information item is then supplied to the display management system 2 by the source of information 9. According to a second variant, the display management system determines characteristic elements in the different images, then it uses these characteristic elements to superpose the images by matching characteristic elements common to several images. As a nonlimiting example, these characteristic elements can be traffic lane intersections, airport surface lighting lamps, signaling panels, etc. The display management system 2 also superposes a characteristic image of the aircraft on the recomposed image 26, to produce a reference image 26r as represented in FIG. 7. The characteristic image of the aircraft can, for example, correspond to an outline 16 of the aircraft and/or to symbols 18 representative of landing gear of the aircraft. To superpose this characteristic image, the display management system can notably take account of an item of information on the current position of the aircraft on the airport surface. An outline 27 represented by chain-dotted lines in FIG. 7 delimits a part to be displayed 30 of the reference image 26r. This part to be displayed 30 is called useful reference image in the rest of the description. This useful reference image corresponds to the display desired on the screen 8 of the cockpit. The display management system 2 controls the display on the screen 8 of the cockpit of an image 28 corresponding to the useful reference image 30. The outline 27 of the useful reference image can notably be predefined in the display management system 2. The position of the outline 27 can, for example, be predefined relative to the position of the characteristic image of the aircraft. According to another possibility, the dimensions and the position of the outline 27 can be set by a pilot of the aircraft, for example by means of an interface of the cockpit, such as a keyboard, a track ball, a touchscreen, etc.

Figure 8:
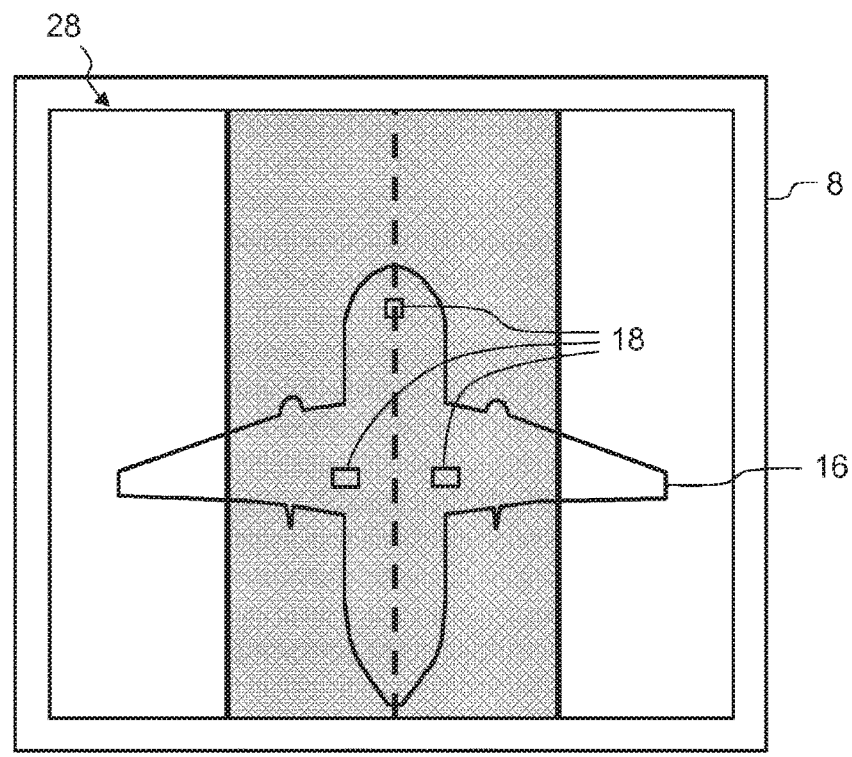
FIGS. 8 and 9 represent an image displayed on a screen of the cockpit of the aircraft, this image corresponding to a part of the image of FIG. 7.

According to a first embodiment represented in FIG. 8, the image 28 corresponds directly to the useful reference image 30. It is therefore displayed according to a point of view corresponding to a plan view of the aircraft.

Figure 9:
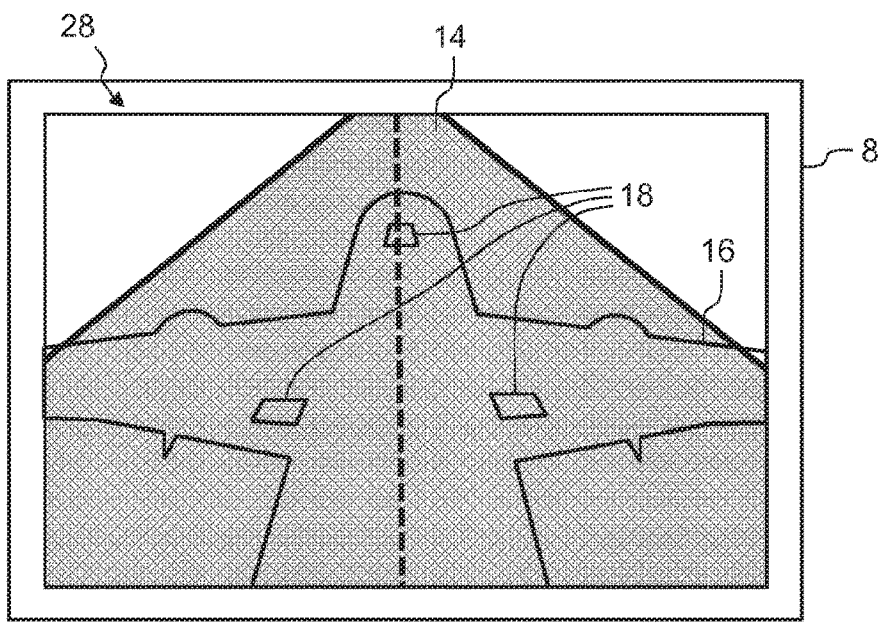

According to a second embodiment, the display management system applies a transformation of the useful reference image so as to produce an image according to a particular point of view. The image 28 corresponds to the duly transformed useful reference image. This particular point of view can, for example, correspond to the point of view of the camera 5 placed on the vertical stabilizer 4, as represented in FIG. 9, or an intermediate point of view between the point of view of the camera 5 and the point of view corresponding to a plan view of the aircraft. Advantageously, the particular point of view varies as a function of an item of information on ground taxiing speed of the aircraft: when the taxiing speed of the aircraft is below a first predetermined speed threshold, for example 10 km/h, the point of view corresponds to a plan view of the aircraft; when the taxiing speed of the aircraft is above a second predetermined speed threshold, for example 50 km/h, the point of view corresponds to the point of view of the camera 5. Advantageously, the item of information on ground taxiing speed of the aircraft is supplied to the display management system 2 by the source of information 9, corresponding, for example, to a GPS receiver or to an inertial reference system IRS of the aircraft. The point of view corresponding to a plan view of the aircraft is particularly well suited for low aircraft taxiing speeds (in particular, below the first speed threshold), because it allows the pilot to make a good appraisal of the position of the landing gear of the aircraft, illustrated by the symbols 18, on the airport surface. The point of view corresponding to the point of view of the camera 5, for its part, is well suited to higher aircraft taxiing speeds (in particular, above the second speed threshold), since it allows the pilot to better appreciate the environment in front of the aircraft and therefore anticipate the future situation of the aircraft. According to a first alternative, the first speed threshold and the second speed threshold are the same, for example substantially equal to 30 km/h, such that the display on the screen 8 switches from one to the other of the abovementioned points of view depending on whether the aircraft taxiing speed is below or above these speed thresholds. Preferably, provision is, however, made for hysteresis so as to avoid untimely switchovers of the display between these two points of view upon small variations of the aircraft taxiing speed. According to another alternative, the first speed threshold and the second speed threshold are distinct and the point of view of the image displayed on the screen 8 changes continuously between the point of view corresponding to a plan view of the aircraft and the point of view corresponding to the point of view of the camera 5 when the aircraft taxiing speed changes from the first speed threshold to the second speed threshold.

Advantageously, elements relating to the trajectory of the aircraft can be embedded in the image 28, for example a representation of a forecast trajectory of the aircraft.

Although the different embodiments mentioned above are described in the case of a camera installed on the vertical stabilizer of the aircraft, other positions of the camera can be envisaged without departing from the scope of the invention. For example, the camera could also be installed under the fuselage of the aircraft, on the wings, etc.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. A method for assisting in the taxiing of an aircraft on the ground, this aircraft comprising:
    a cockpit comprising a display screen,
    a camera configured to acquire images of the environment of the aircraft from a first point of view; and
    a display management system configured to display images on the display screen of the cockpit according to images acquired by the camera,
    said method comprising the following step:

a) acquiring several successive images of the environment of the aircraft by means of said camera, during a displacement of the aircraft on the ground, these images corresponding to different positions of the aircraft on the ground, and comprising the following steps implemented by the display management system:

b) modifying said images by subtracting from said images at least areas corresponding to the aircraft, to produce modified images;

c) combining several of said modified images to produce a recomposed image;

d) obtaining information relating to a current position of the aircraft and superposing a characteristic image of the aircraft on the recomposed image to produce a first reference image in relation to the current position of the aircraft obtained from the information;

d1) applying a transformation of the first reference image so as to produce a second reference image according to a second point of view, the second point of view different than the first point of view; and e) displaying, on the screen of the cockpit, an image corresponding to the first or the second reference image, wherein the second point of view corresponds to one out of the following points of view;

a point of view corresponding to a plan view of the aircraft; and an intermediate point of view between the first point of view and the point of view corresponding to the plan view of the aircraft.

2. The method as claimed in claim 1, further comprising an additional step, after step a) or step b), of transforming the images according to a point of view corresponding to a plan view of the aircraft.

3. The method as claimed in claim 1, wherein, in step c), the images are combined by matching characteristic elements common to several of said images.

4. The method as claimed in claim 1, wherein, in step c), the images are combined by taking into account positions of the aircraft on the ground corresponding to these images.

5. The method as claimed in claim 1, wherein, in step d), the characteristic image of the aircraft comprises at least one of the following elements:

an outline of the aircraft; and symbols representative of landing gear of the aircraft.

6. The method as claimed in claim 1, wherein the particular point of view varies as a function of a taxiing speed of the aircraft on the ground.

7. The method as claimed in claim 1, further comprising the following step after step d):

d2) extracting, from the first reference image, a part to be displayed of the reference image, and, in step e), using as image corresponding to the reference image the image extracted in step d2.

8. A system for assisting in the taxiing of an aircraft on the ground, the aircraft comprising:

a cockpit comprising a display screen, a camera configured to acquire images of the environment of the aircraft from a first point of view; and a display management system configured to display images on the display screen of the cockpit according to images acquired by the camera, the system for assisting in the taxiing on the ground being configured to:

a) acquire several successive images of the environment of the aircraft by means of said camera, during a displacement of the aircraft on the ground, these images corresponding to different positions of the aircraft on the ground, and the display management system configured to:

b) modify said images by subtracting from said images at least areas corresponding to the aircraft, to produce modified images;

c) combining several of said modified images to produce a recomposed image;

d) obtaining information relating to a current position of the aircraft and superposing a characteristic image of the aircraft on the recomposed image to produce a first reference image in relation to the current position of the aircraft obtained from the information;

d1) applying a transformation of the first reference image so as to produce a second reference image according to a second point of view, the second point of view different than the first point of view; and e) displaying, on the screen of the cockpit, an image corresponding to the first or second reference image, wherein the second point of view corresponds to one out of the following points of view;

a point of view corresponding to a plan view of the aircraft; and an intermediate point of view between the first point of view and the point of view corresponding to the plan view of the aircraft.

9. An aircraft comprising:

a cockpit comprising a display screen, a camera configured to acquire images of the environment of the aircraft, a display management system configured to display images on the display screen of the cockpit according to images acquired by the camera, and a system for assisting in the taxiing on the ground as claimed in claim 8.

* * * * *